(12) United States Patent
Williams

(10) Patent No.: US 9,559,522 B2
(45) Date of Patent: Jan. 31, 2017

(54) DISTRIBUTED ENERGY SOURCE SYSTEM

(76) Inventor: Kevin James Williams, Overland Park, KS (US)

( * ) Notice: Subject to any disclaimer, the term of this patent is extended or adjusted under 35 U.S.C. 154(b) by 210 days.

(21) Appl. No.: 12/976,964

(22) Filed: Dec. 22, 2010

(65) Prior Publication Data

US 2011/0148196 A1 Jun. 23, 2011

Related U.S. Application Data

(60) Provisional application No. 61/289,244, filed on Dec. 22, 2009.

(51) Int. Cl.
*H02J 1/12* (2006.01)
*H02J 3/38* (2006.01)

(52) U.S. Cl.
CPC .............. *H02J 3/386* (2013.01); *Y02E 10/763* (2013.01); *Y10T 307/359* (2015.04)

(58) Field of Classification Search
CPC ................................ H02J 3/386; Y02E 10/763
USPC ....................... 307/25, 31–35, 38–41, 64–80; 700/286–298
See application file for complete search history.

(56) References Cited

U.S. PATENT DOCUMENTS

| | | | |
|---|---|---|---|
| 6,522,955 B1 | 2/2003 | Colborn | |
| 7,013,203 B2 | 3/2006 | Moore | |
| 8,347,628 B2* | 1/2013 | Gerard | F02C 1/02 60/650 |
| 8,352,091 B2* | 1/2013 | Haugh | G06F 1/26 307/150 |
| 2006/0276938 A1 | 12/2006 | Miller | |
| 2007/0271006 A1* | 11/2007 | Golden et al. | 700/295 |
| 2008/0047271 A1* | 2/2008 | Ingersoll | 60/645 |
| 2008/0172279 A1* | 7/2008 | Enis et al. | 705/8 |
| 2009/0240380 A1 | 9/2009 | Shah et al. | |
| 2009/0302996 A1 | 12/2009 | Rhee et al. | |
| 2009/0326729 A1* | 12/2009 | Hakim et al. | 700/295 |
| 2010/0010923 A1* | 1/2010 | Shore | G06Q 10/06 705/30 |
| 2010/0100253 A1 | 4/2010 | Fausak et al. | |
| 2010/0211233 A1 | 8/2010 | Roscoe et al. | |
| 2010/0264739 A1* | 10/2010 | Errington | 307/80 |

(Continued)

FOREIGN PATENT DOCUMENTS

| | | |
|---|---|---|
| WO | 2011089854 A1 | 7/2011 |
| WO | WO 2011089854 | 7/2011 |

OTHER PUBLICATIONS

International Search Report and Written Opinion for PCT/US13/69473, mailed May 20, 2014, 19 pages.

(Continued)

*Primary Examiner* — Jared Fureman
*Assistant Examiner* — Duc M Pham
(74) *Attorney, Agent, or Firm* — Spencer Fane LLP

(57) ABSTRACT

An energy management system includes at least one distributed energy source for producing energy, the distributed energy source in electrical communication with at least one consumer device to be powered by electric power, and in electrical communication with an electric utility. The device also includes a CPU in communication with the at least one distributed energy source, the CPU operable to control the flow of energy produced by the at least one distributed energy source. The CPU manipulates the flow of energy to provide efficient usage of the energy based on information from the at least one consumer and the electric utility.

13 Claims, 4 Drawing Sheets

(56) References Cited

U.S. PATENT DOCUMENTS

| | | | |
|---|---|---|---|
| 2011/0001356 A1* | 1/2011 | Pollack | 307/31 |
| 2011/0010018 A1* | 1/2011 | Haugh | 700/295 |
| 2011/0196547 A1 | 8/2011 | Park et al. | |
| 2011/0231028 A1 | 9/2011 | Ozog | |
| 2012/0053740 A1 | 3/2012 | Venkatakrishnan et al. | |
| 2012/0059527 A1* | 3/2012 | Beaston et al. | 700/295 |
| 2012/0065796 A1 | 3/2012 | Brian et al. | |
| 2012/0065797 A1 | 3/2012 | Brian et al. | |
| 2012/0089269 A1 | 4/2012 | Weaver et al. | |
| 2012/0197452 A1 | 8/2012 | Matthews et al. | |
| 2012/0286723 A1 | 11/2012 | Ukita et al. | |

OTHER PUBLICATIONS

International Search Report and Written Opinion for PCT/US2013/069475, mailed May 2, 2014, 11 pages.
First Action Interview Pre-Interview Communication dated Feb. 20, 2015 in U.S. Appl. No. 13/674,735, 5 pages.
First Action Interview Office Action dated Apr. 29, 2015 in U.S. Appl. No. 13/674,735, 9 pages.
International Search Report with Written Opinion dated May 2, 2014 in Application No. PCT/US2013/069476, 7 pages.
International Preliminary Report on Patentability dated May 21, 2015 in PCT Application No. PCT/US2013/069476, 7 pages.
International Preliminary Report on Patentability dated May 21, 2015 in PCT Application No. PCT/US2013/069473, 7 pages.
International Preliminary Report on Patentability dated May 21, 2015 in PCT Application No. PCT/US2013/069475, 7 pages.
Non-Final Office Action dated Jul. 2, 2015 in U.S. Appl. No. 13/837,029, 25 pages.
Final Office Action dated Jul. 17, 2015 in U.S. Appl. No. 13/674,735, 22 pages.

* cited by examiner

DISTRIBUTED ENERGY SOURCE SYSTEM

CROSS-REFERENCE TO RELATED APPLICATIONS

The present invention claims priority of U.S. Provisional Patent Application No. 61/289,244, filed on Dec. 22, 2009, and entitled "Distributed Energy Source System," which is incorporated herein by reference in its entirety.

FIELD OF THE INVENTION

The present invention relates generally to renewable energy sources. More particularly, the present invention concerns combinations of various electric power generation techniques and processes into a single delivery device that is operable for two-way communication with the Smart Grid.

BACKGROUND OF THE INVENTION

The North American power grid was once called the " . . . supreme engineering achievement of the 20$^{th}$ century." Unfortunately, the power grid is quickly aging such that outages and inefficiencies result in great costs to end users.

A growing movement to provide clean energy, utilizing such sources as wind, currently suffers from significant inefficiencies due to limitations within the power grid. Commercial wind farms often produce much greater energy than is realized, but the transmissions lines cannot accommodate the amount of energy produced, thereby resulting in large amounts of wasted effort.

Residential applications are often seen as impractical due to costs, lack of providing enough energy during peak demand, and wasted energy during off-peak times. In addition, there is no application that provides two-way communication between end users and the distribution source.

Current efforts to develop a Smart Grid are ongoing, but these efforts are generally limited to increasing reliability, efficiency, and safety of the power grid, largely in an effort to reduce threats of tenor attacks, resulting in large scale power outages. Unfortunately, there is no system that currently provides the end user the ability to utilize and manage distributed energy sources. Further, there is no system that currently provides the capability of the distributed energy sources, such as in residential applications, to return unused energy to the power grid, or store excess energy for later use by the end-user. Still further, there is no system that provides the end user, or other interested party, such as a stakeholder, the ability to collect usage and generation data, to deliver electricity more efficiently and detect problems within the system, and provide information that allows for strategic placement of distributed generation sources for overall performance improvement.

SUMMARY OF THE INVENTION

An energy management system includes at least one distributed energy source for producing energy, the distributed energy source in electrical communication with at least one consumer device to be powered by electric power, and in electrical communication with an electric utility. The device also includes a CPU in communication with the at least one distributed energy source, the CPU operable to control the flow of energy produced by the at least one distributed energy source. The CPU manipulates the flow of energy to provide efficient usage of the energy based on information from the at least one consumer and the electric utility.

In one embodiment of the invention, the CPU manipulates the flow of energy from the at least one distributed energy source such that at least a portion of the energy is directed to an energy storage device.

In another embodiment of the invention, the CPU manipulates the flow of energy from the at least one distributed energy source such that at least a portion of the energy is directed to the at least one consumer device to be powered by electric power.

In still another embodiment of the invention, the CPU manipulates the flow of energy from the at least one distributed energy source such that at least a portion of the energy is directed to the electric utility.

In another embodiment of the invention, the distributed energy source is a wind turbine.

In another embodiment of the invention, the distributed energy source includes at least one solar panel.

In another embodiment of the invention, the distributed energy sources includes an air compressor for compressing air in at least one compressed air tank, the at least one compressed air tank adapted to release compressed air to rotate a blade of the wind turbine when needed.

The invention also provides a computer-implemented method for facilitating efficient energy usage. The computer carries out the steps of monitoring electricity production by a distributed energy source, monitoring electricity provided by an electric utility, calculating an optimal usage of the electricity produced by the distributed energy source and the electric utility, and manipulating the flow of electricity produced by the distributed energy source and the electric utility to direct the electricity to the distributed energy source, at least one consumer device to be powered by electricity, an electrical grid powered by the electric utility, or a combination of these.

BRIEF DESCRIPTION OF THE DRAWING FIGURES

The present invention is described herein with reference to the following drawing figures, with greater emphasis being placed on clarity rather than scale.

DETAILED DESCRIPTION OF THE INVENTION

Figure 1:
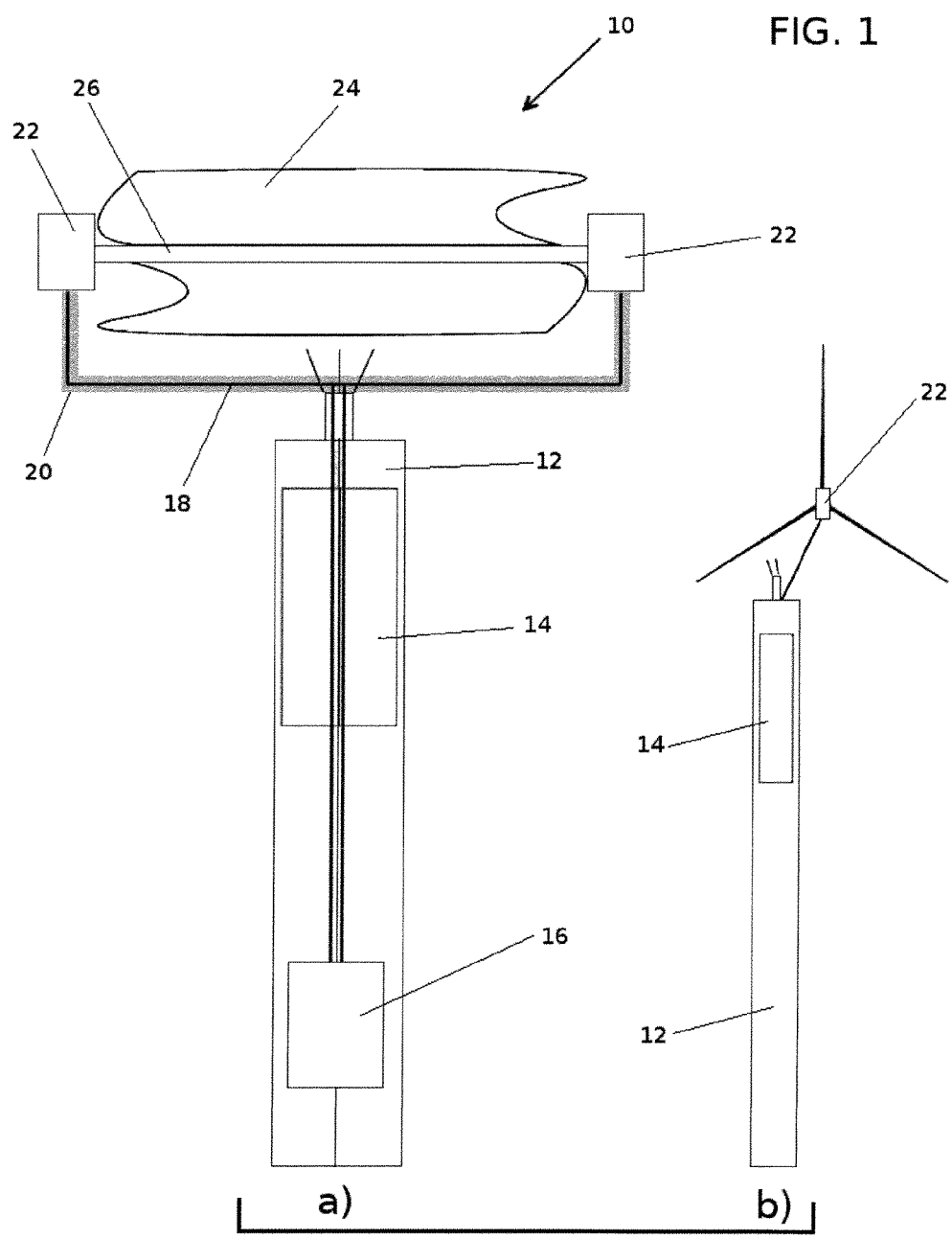
FIG. 1 is a schematic illustration of one embodiment of a distributed energy source for use with the present invention.

The present invention solves the above-described problems and provides a distinct advance in the art of renewable energy sources. More particularly, the present invention provides a system that interacts with and provides two-way communication and energy flow between distributed energy sources, end-users, and utilities. The present invention can be placed near the consumer to generate electric power directly to end-users and to provide excess power back to the distribution system.

In one embodiment, the present invention comprises a computer program stored on a computer-readable media for directing operation of a computer, at least one distributed energy source, an energy storage device, and an electronic network. The computer program communicates across the electronic network with consumer's appliances, the end-user, and the energy distribution source and provides a near real-time graphical representation of the status of the various system components, including energy-related information. The graphical representation presents the data in a readily understandable format, which can be quickly assimilated.

A system is herein described, shown, and otherwise disclosed in accordance with various embodiments, including a preferred embodiment, of the present invention. Broadly, the present invention provides a system for generating, distributing, managing, storing, and diverting energy in two-way communication with the Smart Grid.

The present invention can be implemented in hardware, software, firmware, or a combination thereof. In one embodiment, the invention is implemented with a computer program that operates and manages the components. The computer program communicates with the components and appliances via an electronic network. In one embodiment, the system includes a wireless router for communicating with the equipment and appliances. The equipment includes a CPU, at least one distributed energy source, an energy storage device, and an electronic network. The computer program and equipment illustrated and described herein are merely examples of a program and equipment that may be used to implement the present invention.

The computer program of the present invention is preferably stored in or on computer-readable medium residing on or accessible by the computer for instructing the computer and other components of the equipment to operate as described herein. The computer program may run in DOS, Windows, Unix, Linux, or any other operating system environment and, in one embodiment, comprises an ordered listing of executable instructions for implementing logical functions in the computer and any computing devices coupled with the computer.

The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate, or transport the program for use by or in connection with the instruction execution system, apparatus, or device. The computer-readable medium can be, for example, but is not limited to, an electronic, magnetic, optical, electro-magnetic, infrared, or semiconductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Once the computer program is installed, it may be started with a command, such as "energy.exe". The program then goes through an initialization phase where it checks software protection keys, loads required data from the computer hard drive into memory, sets the control display and the training display for the correct display modes, loads needed drivers for display types and fonts, and initializes the components coupled with the computer.

In one embodiment, the computer program is accessible via the electronic network for use by utilities or end users. The computer program initially displays a main menu or screen on the control display. The main menu provides links to various energy management functions, such as selection of energy sources, energy storage configuration, and energy throttling. The main menu also provides links to sub-menus such as setup whereby a user may configure various options and flags to their specific needs and desires.

The present invention integrates with end-user's appliances and Smart Meters to gather information from a variety of sources and delivers the data over the internet to authorized stakeholders, such as the home owner, business owner, or utility companies. The present invention integrates with an Advanced Metering Infrastructure to allow more efficient use of electricity and improved problem detection within the system. The present invention alleviates the problems during peak load demand, because it provides information allowing strategic placement of the system throughout the Smart Grid. The present invention provides a constant and controllable source of energy from distributed, variable sources.

The present invention controls operation of the distributed energy source, and determines where to route or store energy. In one embodiment, energy is routed to an end user in close proximity to the energy source. In another embodiment, energy is stored for later use. In one embodiment, the energy is stored as compressed air. In another embodiment, energy is returned to a utility company for later consumption by another end user.

In one embodiment, the distributed energy source is a wind turbine, as shown, for example, in FIG. 1. In the exemplary embodiment of such a device shown in the figure, the wind turbine 10 includes a housing 12, compressed air canisters 14, an inverter 16, a conduit 20, electrical lines 18, generators 22, turbine blade 24, and shaft 26. Though each of these features is shown in FIG. 1, it is contemplated that some embodiments of a wind turbine adapted for use with the present invention may include only a portion of these. For example, compressed air canisters 14 may not be included in all embodiments. Turbine blade 24 rotates, causing a corresponding rotation of shaft 26, the rotary movement producing energy in generators 22. The operation of wind turbines and the production of electricity therefrom is well-known in the art and will not be detailed here. Inverter 14 converts the direct current produced by the wind turbine to alternating current. Wind turbines may produce variable frequency AC, which cannot be handled by public utility grids. In such cases, prior to providing electricity to the grid, the present device utilizes a rectifier (not shown) to convert the variable frequency AC to direct current, which is then converted to AC having the same frequency as the public grid utilizing inverter 14. During periods of high wind, the power generated by the wind turbine may be used to power an air compressor that compresses air in compressed air canisters 14. During periods of relatively low wind, this compressed air can be used to turn turbine blades 24 or to augment the turning of the blades by natural wind. FIG. 1a shows a front schematic view of one embodiments of a device of the present invention, while FIG. 1b shows a side schematic view of that device.

Figure 2:
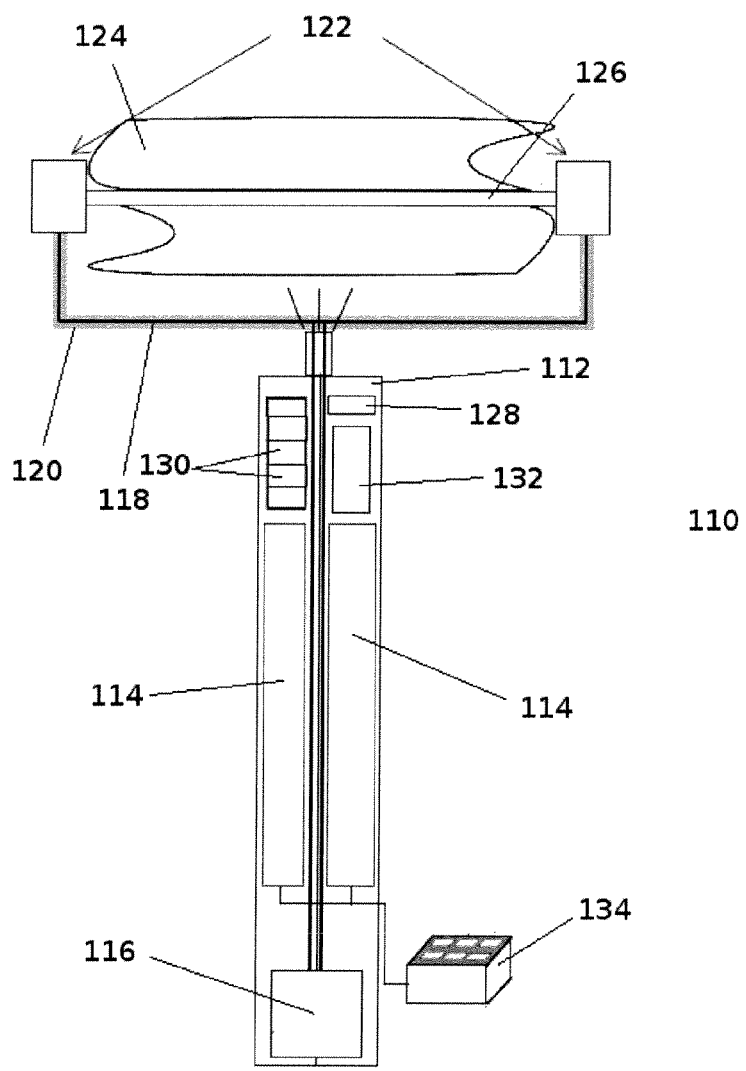
FIG. 2 is a schematic illustration of one embodiment of a distributed energy source and system of the present invention.

FIG. 2 depicts another embodiment of a distributed energy source of the present invention, also a wind turbine, though with solar panels associated therewith. In the exemplary embodiment of such a device shown in the figure, the wind turbine 110 includes a housing 112, compressed air canisters 114, an inverter 116, a conduit 120, electrical lines 118, generators 122, turbine blade 124, shaft 126, solar panels 134, CPU 132, wireless router 128, and batteries 130. As with the device shown in FIG. 1, it is contemplated that some embodiments will not include all of these components. For example, some embodiments may eliminate the compressed air canisters 114, batteries 130, or wireless router 128. It is contemplated that solar panels 134 may provide electrical power directly into the present system, either for use by a consumer or for delivery to the public power grid. Alternatively, solar panels 134 may provide power to an air compressor for compressing air in compressed air canisters 114. During periods of high wind, the power generated by the wind turbine may be used to power an air compressor that compresses air in compressed air canisters 14. During periods of relatively low wind, this compressed air can be used to turn turbine blades 24 or to augment the turning of the blades by natural wind. In some instances, power from solar panels 134 may do serve any combination of these functions.

CPU 132 is preferably in communication with a display (not shown) for providing a user of the present system with information regarding, for example, electricity usage and distribution. The CPU may also be in communication with an electric utility for providing individuals working at the utility with information. Finally, the CPU may be in communication with the internet in order to deliver data over the internet. The communication between the CPU and other devices or networks may be wired, wireless, or any combination of the two.

In another embodiment, the distributed energy source is a solar panel. In yet another embodiment, the distributed energy source is a wave turbine. In one embodiment, the system releases the compressed air to move the wind turbine and generate energy.

In one embodiment, the wind turbine is a vertical axis wind turbine. In another embodiment, the wind turbine axis is variable. The computer program controls the axis of the wind turbine based on whether the turbine is being powered by natural air flow or compressed air.

In one embodiment, energy sources are placed near consumers to generate electric power directly to end-users and provides excess power back to electric utility's distribution system. The information provided to the interested party allows energy sources to be placed strategically throughout the Smart Grid to provide greater efficiency and reduce problems associated with peak demand.

Figure 3:
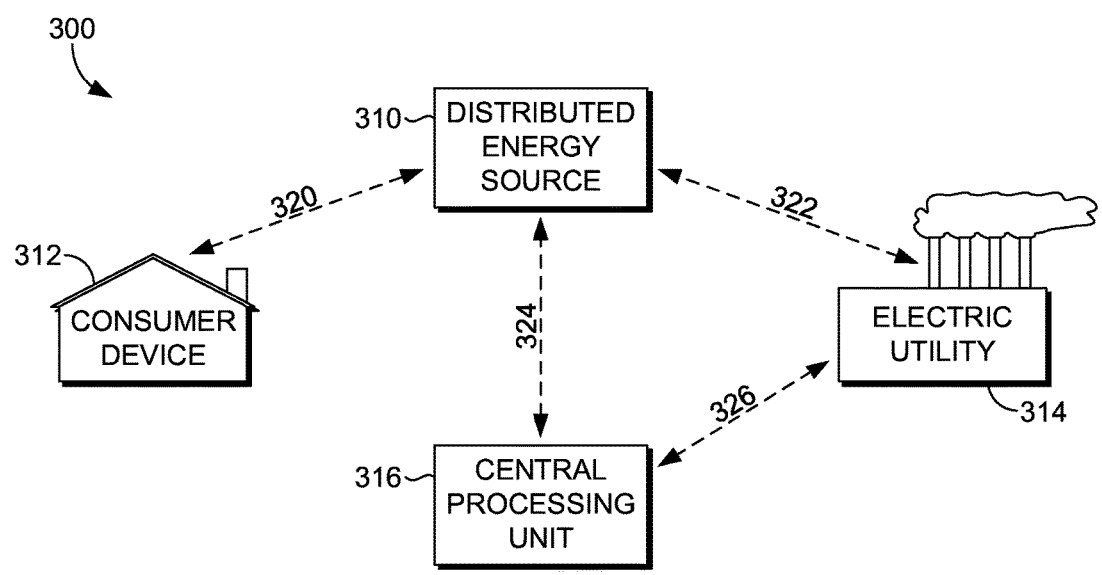
FIG. 3 is a schematic illustration of an energy management system according to the present invention.

FIG. 3 illustrates energy management system 300. Energy management system 300 has distributed energy source 310, consumer device 312, electric utility 314, and central processing unit 316. Distributed energy source 310 is capable of producing energy. Consumer device 312 is capable of being powered by electric power. Electric utility 314 is capable of providing energy. Communication illustration 320, shows communication between distributed energy source 310 and consumer device 312. Communication illustration 322, shows communication between distributed energy source 310 and electric utility 314. Communication illustration 324, shows communication between distributed energy source 310 and central processing unit 316. Additionally, communication illustration 326 shows communication between central processing unit and electric utility 314.

Figure 4:
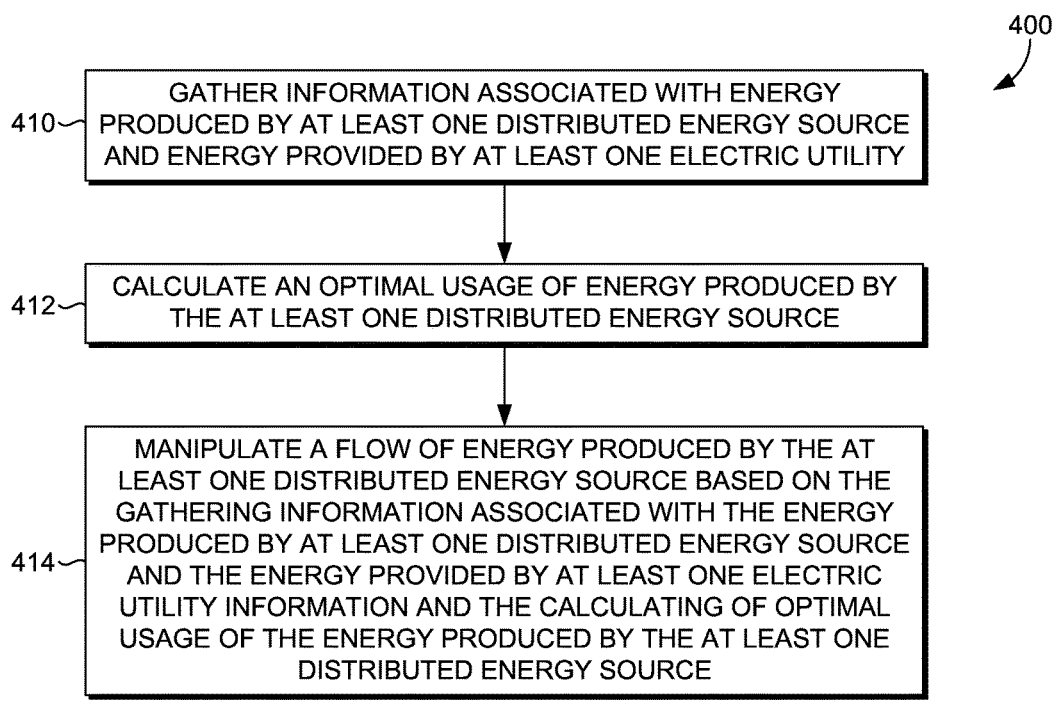
FIG. 4 is a flow diagram of steps for managing energy according to the present invention.

FIG. 4 illustrates a method 400 for managing energy. At step 410, information associated with energy produced by at least one distributed energy source and energy provided by at least one electric utility is gathered. At step 412, an optimal usage of energy produced by the at least one distributed energy source is calculated. At step 414, a flow of energy produced by the at least one distributed energy source is manipulated based on the gathering information associated with the energy produced by at least one distributed energy source and the energy provided by at least one electric utility information and the calculating of optimal usage of the energy produced by the at least one distributed energy source.

Although the invention has been disclosed with reference to various particular embodiments, it is understood that equivalents may be employed and substitutions made herein without departing from the scope of the invention as received in the claims.

Having thus described the preferred embodiments of the invention, what is claimed as new and desired to be protected by Letters Patent includes the following:

1. An energy management system comprising:
   at least one distributed energy source for producing energy, the distributed energy source being in direct electrical communication with (1) at least one consumer device powered by electric power and (2) at least one electric utility configured to provide energy, wherein the at least one distributed energy source is distinct from the at least one electric utility, wherein the distributed energy source is at least a wind turbine coupled with a solar panel; and
   a central processing unit ("CPU") in communication with the at least one distributed energy source and the at least one electric utility, the CPU configured to control the flow of energy produced by the at least one distributed energy source based on information received from a consumer and the at least one electric utility, wherein the consumer is a person.

2. The system according to claim 1 wherein the CPU is configured to manipulate at least a portion of the flow of energy from the at least one distributed energy source to the at least one consumer device.

3. The system according to claim 1 wherein the CPU is configured to manipulate at least a portion of the flow of energy from the at least one distributed energy source to the at least one electric utility.

4. The system according to claim 1 wherein the at least one distributed energy source is a wind turbine.

5. The system according to claim 1 wherein the at least one distributed energy source is a solar panel.

6. The system according to claim 1 wherein the CPU is further configured to monitor energy produced by the at least one distributed energy source.

7. The system according to claim 1 wherein the CPU is further configured to monitor energy provided by the at least one electric utility.

8. The system according to claim 1 wherein the CPU is further configured to calculate an optimal use of energy produced by the at least one distributed energy source.

9. The system according to claim 1 wherein the CPU is further configured to deliver information to the consumer.

10. The system according to claim 1 wherein the CPU is further configured to deliver information to the at least one electric utility.

11. One or more non-transitory computer-readable media having embodied thereon computer-executable instructions that, when executed by a processor in a computer device associated with an energy management system, cause the computing device to perform a method of managing energy, the method comprising:
    gathering information associated with a consumer, wherein the consumer is a person;
    gathering information associated with energy produced by at least one distributed energy source, wherein the at least one distributed energy source is at least a wind turbine coupled with a solar panel;
    gathering information associated with energy provided by at least one electric utility, wherein the at least one distributed energy source is distinct from the at least one electric utility;
    calculating an optimal usage of energy produced by the at least one distributed energy source; and
    manipulating a flow of energy produced by the at least one distributed energy source based on the gathering information associated with the consumer, the energy produced by the at least one distributed energy source, the energy provided by at least one electric utility information, and the calculating of optimal usage of the energy produced by the at least one distributed energy source.

12. The media of claim 11, wherein manipulating the flow of energy produced by the at least one distributed energy source comprises directing the flow of energy to at least one consumer device.

13. The media of claim 11, wherein manipulating the flow of energy produced by the at least one distributed energy source comprises directing the flow of energy to at least one electrical grid powered by the electric utility.

* * * * *